(12) United States Patent
Pezzi

(10) Patent No.: US 12,545,905 B2
(45) Date of Patent: Feb. 10, 2026

(54) COMPOSITIONS AND METHODS FOR NUCLEIC ACID CAPTURE BY CHEMICAL BAIT

(71) Applicant: Siemens Healthcare Diagnostics Inc., Tarrytown, NY (US)

(72) Inventor: Hannah Pezzi, Emeryville, CA (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 1097 days.

(21) Appl. No.: 17/310,669

(22) PCT Filed: Feb. 27, 2020

(86) PCT No.: PCT/US2020/020130
§ 371 (c)(1),
(2) Date: Aug. 17, 2021

(87) PCT Pub. No.: WO2020/180611
PCT Pub. Date: Sep. 10, 2020

(65) Prior Publication Data
US 2022/0119798 A1 Apr. 21, 2022

Related U.S. Application Data

(60) Provisional application No. 62/814,049, filed on Mar. 5, 2019.

(51) Int. Cl.
*C12N 15/10* (2006.01)

(52) U.S. Cl.
CPC ..... *C12N 15/1006* (2013.01); *C12N 15/1013* (2013.01)

(58) Field of Classification Search
CPC .............. C12N 15/1006; C12N 15/1013
See application file for complete search history.

(56) References Cited

U.S. PATENT DOCUMENTS 9,051,601 B2  6/2015  Becker et al.
2012/0004113 A1  1/2012  Moon

FOREIGN PATENT DOCUMENTS

WO  2008140573  11/2008
WO  2014182574  11/2014
WO  2017096394  6/2017

OTHER PUBLICATIONS

Murphy IV and Churchill, Nonsequence-specific DNA recognition: a structural perspective, Structure, 2000, 8, R83-R89 (Year: 2000).*
Schmidt and Liu, Chapter Four—Recent Advances in the Chemistry of Acridines, Advances in Heterocyclic Chemistry, 2015, 115, 287-353 (Year: 2015).*

(Continued)

*Primary Examiner* — Anne M. Gussow
*Assistant Examiner* — Allison E Schloop

(57) ABSTRACT

A bait is provided, wherein the bait comprises a first portion capable of binding to a nucleic acid in a sequence-independent manner, and a second portion capable of binding to a non-silica capture substrate. Compositions comprising such a bait and methods for using such a bait are also disclosed.

31 Claims, 1 Drawing Sheet

(56) References Cited

OTHER PUBLICATIONS

Karlsson et al., Groove-binding unsymmetrical cyanine dyes for staining of DNA: syntheses and characterization of the DNA-binding, Nucleic Acids Research, 2003, 31, 6227-6234 (Year: 2003).*
Nunez et al., Synthesis and DNA binding profile of monomeric, dimeric, and trimeric derivatives of crystal violet, Bioorganic Chemistry, Mar. 2019, 83, 297-302 (Year: 2019).*
Xu et al., Molecular insights for the biological interactions between polyethylene glycol and cells, Biomaterials, 2017, 147, 1-13 (Year: 2017).*
Analysis of N-terminus and C-terminus in Protein: A Comprehensive Guide [online]. Creative Proteomics, [2024] [retrieved on Nov. 21, 2024]. Retrieved from: https://www.creative-proteomics.com/proteinseq/resource/analysis-of-n-terminus-and-c-terminus-in-protein.htm (Year: 2024).*
Magnetic Beads (Carboxylated) [online]. MCLAB, [2024] [retrieved on Nov. 20, 2024]. Retrieved from: https://mclab.com/mc/magnetic-beads-carboxylate/ (Year: 2014).*
Avidin [online]. CD Bioparticles, [2024] [retrieved Nov. 20, 2024]. Retrieved from: https://www.cd-bioparticles.com/product/avidin-list-136.html (Year: 2024).*
NHS-Activated magnetic beads, Pierce™ [online]. VWR, [2024] [retrieved Nov. 20, 2024]. Retrieved from: https://export.vwr.com/store/product/18487928/null (Year: 2024).*
Magnosphere™ MS160/Tosyl [online]. MBL, [2024] [retrieved Nov. 20, 2024]. Retrieved from: https://products.mblintl.com/products/j-ms-s160t/ (Year: 2024).*
Kapuscinski et al., Luminescence of the Solid Complexes of Acridine Orange with RNA, Cytometry, 1982, 2, 201-211 (Year: 1982).*
Nakamura, Hoechst tagging: a modular strategy to design synthetic fluorescent probes for live-cell nucleus imaging, ChemComm, Apr. 2014, 50, 6149-6152 (Year: 2014).*
AAT Bioquest, Hoechst DNA Stains for Live and Fixed Cells [online]. AAT Bioquest, [2025] [retrieved on Sep. 10, 2025]. Retrieved from: www.aatbio.com/catalog/hoechst-dna-stains-for-live-and-fixed-cells (Year: 2025).*
The Protein Man, The Advantages of Biotinylation Tagging in Protein Purification [online]. G-Biosciences, [Aug. 2018] [retrieved on Sep. 10, 2025]. Retrieved from: info.gbiosciences.com/blog/the-advantages-of-biotinylation-tagging-in-protein-purification (Year: 2018).*
Thermo Scientific, Pierce™ NHS-Activated Magnetic Beads [online]. Thermo Scientific, [Sep. 2013] [retrieved on Sep. 10, 2025]. Retrieved from: documents.thermofisher.com/TFS-Assets/LSG/manuals/MAN0011758_Pierce_NHSActiv_Mag_Bead_UG.pdf (Year: 2013).*
Thermo Scientific II, MagnaBind™ Carboxyl Derivatized Beads [online]. Thermo Scientific, [Jan. 2012] [retrieved on Sep. 10, 2025]. Retrieved from: documents.thermofisher.com/TFS-Assets/LSG/manuals/MAN0011336_MagnaBind_Carboxyl_Deriv_%20Bead_UG.pdf (Year: 2012).*
Invitrogen, Dynabeads® M-280 Tosylactivated [online]. Invitrogen, [May 2012] [retrieved on Sep. 10, 2025]. Retrieved from: documents.thermofisher.com/TFS-Assets/LSG/manuals/dynabeads_m280tosylactivated_man.pdf (Year: 2012).*
Benvin, L. Andrea et al: "Fluorescent DNA Nanotage: Supramolecular Fluorescent Labels Based on Intercalating Dye Arrays Assembled on Nanostructured DNA Templates"; Journal of the American Chemical Society; vol. 129, No. 7, Feb. 1, 2007 (Feb. 1, 2007), pp. 2025-2034, XP055448344.
Coury J.E. et al: "Scanning probe visualization of of electrostatically immobilized intercalating drug-nucleic acid complexes"; Journal of Vacum Science; vol. 13, No. 3, May 1, 1995, (May 1, 1995), pp. 1746-1751, XP055908435.
Lo Kenneth, Kam-Wing et al: "Nucleic Acid Intercalators and Avidin Probes Derived from Luminescent Cyclometalated Iridium (III) -Dipyridoquinoxaline and -Dipyridophenazine Complexes"; Chemistry—A European Journal; vol. 12, No. 5, Feb. 1, 2006 (Feb. 1, 2006), pp. 1500-1512, XP055908448.
International Search Report for PCT/US2020/020130 dated Jul. 1, 2020.
"Thermo Scientific Avidin-Biotin Technical Handbook," Retrived from the Internet: <http://www.piercenet.com/files/1601675_AvBi_HB_INTL.pdf>; pp. 1-51, entire document / Feb. 18, 2013.
"Dynabeads M-280 Tosylactivated"; Invitrogen by life technologies; Catalog No. 14203, 14204. Rev. 010. Retrieved online (Apr. 27, 2020] URL: <https://www .thermofisher.com/order/catalog/producV14203#/14203>; May 2012.
Rashid, Jia et al; "The strategies of DNA immobilization and hybridization detection mechanism In the construction oif electro-chemical DNA sensor: A review"; Sensing and Bio-Sensing Research; vol. 16; pp. 19-31; https://doi.org/10.1016/j.sbsr., (2017).
Slim, Mohamed et al: "DNA-Protein Noncovalent Cross-Linking: Ruthenium Dipyridophenazine Biotin Complex for the Assembly of Proteins and Gold Nanoparticels on DNA Templates"; Chembiochem; vol. 8, No. 7, May 7, 2007 pp. 804-812.

* cited by examiner

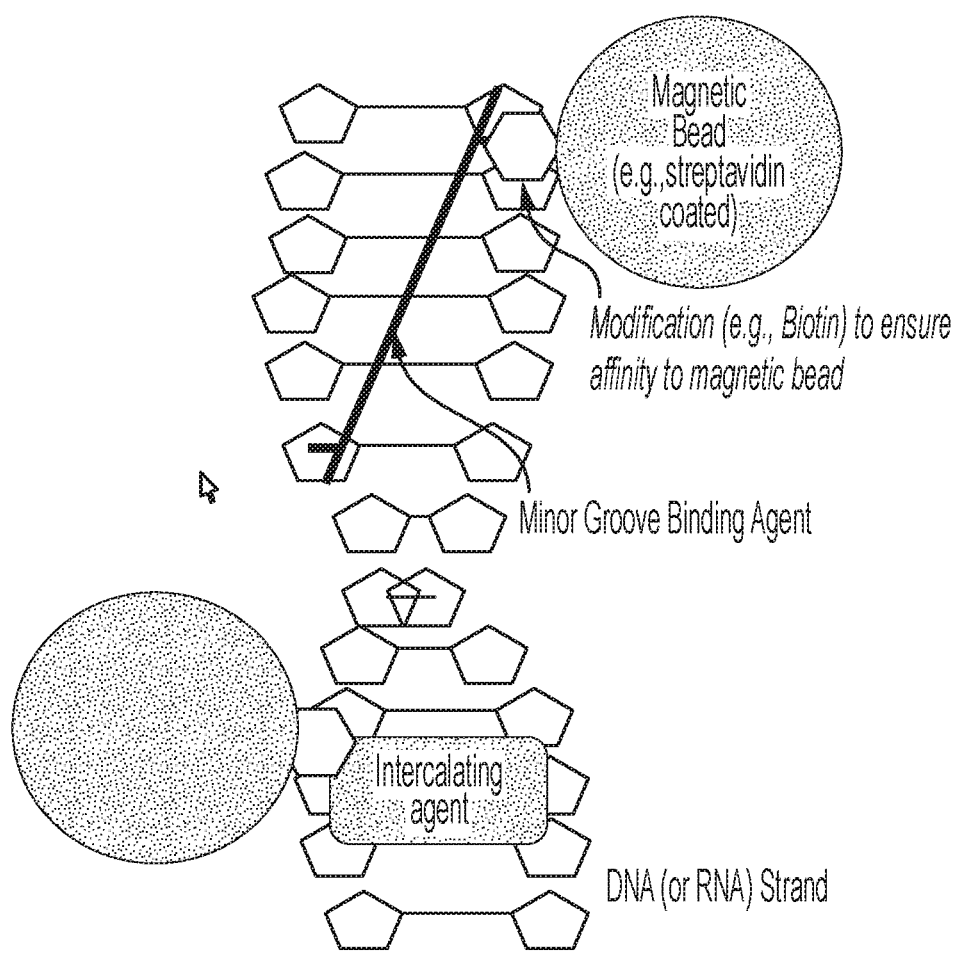

COMPOSITIONS AND METHODS FOR NUCLEIC ACID CAPTURE BY CHEMICAL BAIT

BACKGROUND

In order to analyze nucleic acids, it can be helpful to isolate and/or enrich the nucleic acids, e.g., from a sample, such as a biological sample. Nucleic acid capture baits can be used to isolate and/or enrich nucleic acids.

SUMMARY

The present disclosure provides a nucleic acid capture bait that overcomes the challenges of traditional capture techniques. Traditionally, nucleic acid capture has been performed using one of two approaches: (1) silica-based surface modifications, or (2) sequence specific capture. The present disclosure provides the recognition that these two traditional approaches can present opposite challenges. With silica-based surface modifications, capture of total nucleic acid can be relatively easy, but is accomplished with relatively low specificity. For 'total' nucleic acid, silica coated magnetic beads are used to bind nucleic acid in the presence of certain salts and pH conditions. While a high affinity for nucleic acid can be achieved in these conditions, in complex biological samples (e.g., plasma, whole blood, sputum, stool), non-nucleic acid components in the sample can bind to the beads as well. These additional components can impact downstream readouts, e.g., PCR-based endpoints. Thus, while silica magnetic beads enable generic capture of nucleic acid from a sample, a level of inhibitors and/or non-target material carried through can present challenges with using the technique.

Sequence specific capture can suffer from different challenges. For example, while sequence specific capture can result in high specificity nucleic acid capture, it can be difficult to perform when total nucleic acid is required.

Among other things, the present disclosure provides a nucleic acid capture bait that is capable of both binding to nucleic acid with high specificity and capturing total nucleic acid. The present disclosure provides the recognition that entities that bind specifically to nucleic acid, but in a sequence independent manner, can be particularly useful for nucleic acid capture. Baits described herein can capture nucleic acids of various types (e.g., DNA, RNA, single stranded, double stranded, comprising natural nucleotides, comprising synthetic nucleotides, comprising natural nucleosides, comprising synthetic nucleosides, etc.), various lengths, and/or having differing sequences. Baits described herein can also capture nucleic acid, while minimizing interactions with other sample components. The reduction of other sample components being carried forward in a capture process can reduce the impact of such components on experimental readouts and increase authentic readouts from components of interest, e.g., nucleic acids of interest. The present disclosure provides that recognition that reducing the impact of non-nucleic acid components on readouts can, in turn, increase signal from nucleic acid(s) of interest, decrease background noise, and/or decrease false positives. Such features can be beneficial, for example, when analyzing small amounts of nucleic acid or a rare mutation in a nucleic acid.

In some embodiments, the present disclosure describes a bait comprising a first portion.

In some embodiments, the present disclosure describes a bait comprises a first portion and a non-silica capture substrate. In some embodiments, a first portion is bound to a non-silica capture substrate.

In some embodiments, the present disclosure describes a bait comprises a first portion, and a second portion.

In some embodiments, a bait as described herein comprises a linker. In some embodiments, a first portion is joined to a non-silica capture substrate via a linker. In some embodiments, a first portion is joined to a second portion via a linker.

In some embodiments, a first portion as described herein is a nucleic acid-binding portion, e.g., a portion that is capable of binding to a nucleic acid in a sequence-independent manner. In some embodiments, a nucleic acid-binding portion can be a generic, non-oligo nucleic acid-binding portion that specifically targets RNA, DNA, or both.

In some embodiments, a first portion as described herein is or comprises a chemical entity. In some embodiments, a first portion as described herein is or comprises an nucleic acid binding dye.

In some embodiments, a nucleic acid binding dye as described herein is or comprises a bisbenzimide. In some embodiments, a bisbenzimide is or comprises Hoechst 33258, Hoechst 33342, or Hoechst 34580.

In some embodiments, a nucleic acid binding dye as described herein is or comprises 4',6-diamidino-2-phenylindole (DAPI).

In some embodiments, a nucleic acid binding dye as described herein is or comprises SYTO 9, SYTO 11, SYTO 12, SYTO 13, SYTO 14, SYTO 15, SYTO 16, SYTO 17, SYTO 18, SYTO 20, SYTO 21, SYTO 22, SYTO 23, SYTO 24, SYTO 25, SYTO 59, SYTO 60, SYTO 61, SYTO 62, SYTO 63, SYTO 64, or SYTO BC.

In some embodiments, a nucleic acid binding dye as described herein is or comprises a cyanine dye. In some embodiments, a cyanine dye is or comprises PicoGreen, OliGreen and RiboGreen, SYBR Gold, SYBR Green I, or SYBR Green II. In some embodiments, a cyanine dye is or comprises a cyanine dimer. In some embodiments, a cyanine dye is or comprises POPO-1, BOBO-1, YOYO-1, TOTO-1, JOJO-1, POPO-3, LOLO-1, BOBO-3, YOYO-3, or TOTO-3.

In some embodiments, a nucleic acid binding dye as described herein is or comprises a phenanthridine or an acridine. In some embodiments, a phenanthridine is or comprises ethidium bromide, propidium iodide, hexidium iodide, dihydroethidium, ethidium homodimer-1, or ethidium homodimer-2. In some embodiments, an acridine is acridine orange.

In some embodiments, a nucleic acid binding dye as described herein is or includes a triarylmethane dye. In some embodiments, a triarylmethane dye is crystal violet.

In some embodiments, a nucleic acid binding dye as described herein is or includes a fluorescent dye. In some embodiments, a fluorescent dye is 7-aminoactinomycin D.

In some embodiments, a first portion as described herein does not comprise a nucleic acid.

In some embodiments, a first portion as described herein is capable of binding to RNA in a nucleic acid sequence-independent manner. In some embodiments, a first portion as described herein is capable of binding to single stranded RNA in a nucleic acid sequence-independent manner. In some embodiments, a first portion as described herein is capable of binding to double stranded RNA in a nucleic acid sequence-independent manner.

In some embodiments, a first portion as described herein is capable of binding to DNA in a nucleic acid sequence-independent manner. In some embodiments, a first portion as described herein is capable of binding to single stranded DNA in a nucleic acid sequence-independent manner. In some embodiments, a first portion as described herein is capable of binding to double stranded DNA in a nucleic acid sequence-independent manner. In some embodiments, a first portion as described herein is capable of binding to the minor groove of double stranded DNA. In some embodiments, a first portion as described herein is capable of binding to the major groove of double stranded DNA. In some embodiments, a first portion as described herein is capable of binding to the major groove of double stranded DNA is or comprises an intercalator.

In some embodiments, a second portion as described herein is a substrate-binding portion, e.g., a portion that is capable of binding to a substrate. In some embodiments, a substrate is a non-silica capture substrate.

In some embodiments, a second portion as described herein is a modification on the first portion. In some embodiments, a second portion as described herein is a substituent of the first portion. In some embodiments, a second portion as described herein is or comprises an amine or a sulphydryl group.

In some embodiments, a second portion as described herein is capable of binding to a non-silica capture substrate directly or indirectly.

In some embodiments, a second portion as described herein is or comprises a ligand and the non-silica capture substrate is or comprises a ligand-binding protein. In some embodiments, a ligand is or comprises biotin or desthiobiotin and the ligand-binding protein is or comprises avidin, streptavidin, Tamavidin 1, Tamavidin 2, NeutrAvidin, or CaptAvidin.

In some embodiments, a second portion as described herein is or comprises an amine and the non-silica capture substrate is or comprises one or more N-hydroxysuccinimide esters, one or more aldehydes, one or more isocyanates, one or more acyl azides, one or more carbodiimides, one or more carbonates, one or more epoxides, one or more fluorophenyl esters, one or more anhydrides, one or more imidoesters, or a combination thereof.

In some embodiments, a second portion as described herein comprises a sulphydryl group or an amine and the non-silica capture substrate comprises one or more carboxylic acids.

In some embodiments, a second portion as described herein comprises an amine or a sulphydryl group and the non-silica capture substrate comprises one or more tosyl groups.

In some embodiments, a linker as described herein is or comprises a spacer. In some embodiments, a linker as described herein is or comprises a polyethylene glycol.

In some embodiments, a non-silica capture substrate as described herein comprises one or more beads. In some embodiments, one or more beads are one or more magnetic beads.

In some embodiments, a bait as described herein includes a modification that enhances its water solubility when compared to a comparable bait without the modification.

In some embodiments, a bait as described herein includes one or more polyethylene glycol moieties.

Among other things, the present disclosure provides a complex comprising a bait as described herein, and a nucleic acid bound to a first portion of the bait. In some embodiments, a bait includes a second portion and a complex comprises a non-silica capture substrate bound to the second portion of the bait.

Among other things, the present disclosure provides a kit comprising a bait as described herein. In some embodiments, a kit comprises a non-silica capture substrate.

Among other things, the present disclosure provides a method comprising contacting a sample comprising a plurality of nucleic acids with one or more baits as described herein. In some embodiments, one or more baits are a plurality of baits. In some embodiments, a method as described herein comprises contacting a sample comprising a plurality of nucleic acids with one or more baits as described herein and a non-silica capture substrate, thereby forming a sample comprising one or more nucleic acid-bait-substrate complexes.

In some embodiments, a plurality of baits as described herein consists of a plurality of identical baits. In some embodiments, a plurality of baits as described herein comprises two or more subsets of baits, where the subsets of baits are different from each other. In some embodiments, different baits comprise different first portions and/or different second portions.

In some embodiments, a non-silica capture substrate as described herein comprises one or more beads. In some embodiments, one or more beads are one or more magnetic beads.

In some embodiments, a sample as described herein was obtained from a mammal. In some embodiments, a mammal is a human. In some embodiments, a sample as described herein was obtained from a plant. In some embodiments, a sample as described herein was obtained from a bacteria, virus, or yeast cell.

In some embodiments, a sample as described herein is or comprises tissue or cells. In some embodiments, a sample as described herein is or comprises whole blood, plasma, sputum, saliva, stool, serum, or urine. In some embodiments, a sample as described herein is or comprises tumor cells. In some embodiments, a tumor cells are circulating tumor cells. In some embodiments, a sample as described herein is or comprises fetal cells. In some embodiments, fetal cells are circulating fetal cells.

In some embodiments, a sample as described herein comprises a swab, or a swab in transport media.

In some embodiments, a method as described herein comprises separating one or more nucleic acid-bait-substrate complexes from a sample.

In some embodiments, a method as described herein is a method of isolating a nucleic acid(s). In some embodiments, a method as described herein is a method of enriching a nucleic acid(s). In some embodiments, a method as described herein is a method of amplifying a nucleic acid(s). In some embodiments, a method as described herein is a method of sequencing a nucleic acid(s). In some embodiments, a method as described herein is a method of detecting a mutation in a nucleic acid(s). In some embodiments, a method as described herein is a method of genotyping a subject. In some embodiments, a method as described herein is a method of diagnosing a subject, e.g., with a disease or condition mediated by a nucleic acid mutation.

These, and other aspects encompassed by the present disclosure, are described in more detail below and in the claims.

Definitions

The scope of the present invention is defined by the claims appended hereto and is not limited by certain embodiments described herein. Those skilled in the art, reading the present specification, will be aware of various modifications that may be equivalent to such described embodiments, or otherwise within the scope of the claims. In general, terms used herein are in accordance with their understood meaning in the art, unless clearly indicated otherwise. Explicit definitions of certain terms are provided below; meanings of these and other terms in particular instances throughout this specification will be clear to those skilled in the art from context.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The articles "a" and "an," as used herein, should be understood to include the plural referents unless clearly indicated to the contrary. Claims or descriptions that include "or" between one or more members of a group are considered satisfied if one, more than one, or all of the group members are present in, employed in, or otherwise relevant to a given product or process unless indicated to the contrary or otherwise evident from the context. In some embodiments, exactly one member of a group is present in, employed in, or otherwise relevant to a given product or process. In some embodiments, more than one, or all group members are present in, employed in, or otherwise relevant to a given product or process. It is to be understood that the invention encompasses all variations, combinations, and permutations in which one or more limitations, elements, clauses, descriptive terms, etc., from one or more of the listed claims is introduced into another claim dependent on the same base claim (or, as relevant, any other claim) unless otherwise indicated or unless it would be evident to one of ordinary skill in the art that a contradiction or inconsistency would arise. Where elements are presented as lists (e.g., in Markush group or similar format), it is to be understood that each subgroup of the elements is also disclosed, and any element(s) can be removed from the group. It should be understood that, in general, where embodiments or aspects are referred to as "comprising" particular elements, features, etc., certain embodiments or aspects "consist," or "consist essentially of," such elements, features, etc. For purposes of simplicity, those embodiments have not in every case been specifically set forth in so many words herein. It should also be understood that any embodiment or aspect can be explicitly excluded from the claims, regardless of whether the specific exclusion is recited in the specification.

About: The term "about", when used herein in reference to a value, refers to a value that is similar, in context to the referenced value. In general, those skilled in the art, familiar with the context, will appreciate the relevant degree of variance encompassed by "about" in that context. For example, in some embodiments, the term "about" may encompass a range of values that within 25%, 20%, 19%, 18%, 17%, 16%, 15%, 14%, 13%, 12%, 11%, 10%, 9%, 8%, 7%, 6%, 5%, 4%, 3%, 2%, 1%, or less of the referred value.

Affinity: As is known in the art, "affinity" is a measure of the tightness with a particular ligand binds to its partner. Affinities can be measured in different ways. In some embodiments, affinity is measured by a quantitative assay. In some such embodiments, binding partner concentration may be fixed to be in excess of ligand concentration so as to mimic physiological conditions. Alternatively or additionally, in some embodiments, binding partner concentration and/or ligand concentration may be varied. In some such embodiments, affinity may be compared to a reference under comparable conditions (e.g., concentrations).

Analog: As used herein, the term "analog" refers to a substance that shares one or more particular structural features, elements, components, or moieties with a reference substance. Typically, an "analog" shows significant structural similarity with the reference substance, for example sharing a core or consensus structure, but also differs in certain discrete ways. In some embodiments, an analog is a substance that can be generated from the reference substance, e.g., by chemical manipulation of the reference substance. In some embodiments, an analog is a substance that can be generated through performance of a synthetic process substantially similar to (e.g., sharing a plurality of steps with) one that generates the reference substance. In some embodiments, an analog is or can be generated through performance of a synthetic process different from that used to generate the reference substance.

Approximately: As applied to one or more values of interest, includes to a value that is similar to a stated reference value. In certain embodiments, the term "approximately" or "about" refers to a range of values that fall within ±10% (greater than or less than) of the stated reference value unless otherwise stated or otherwise evident from the context (except where such number would exceed 100% of a possible value).

Associated: Two events or entities are "associated" with one another, as that term is used herein, if the presence, level and/or form of one is correlated with that of the other. For example, a particular entity (e.g., polypeptide, genetic signature, metabolite, microbe, etc) is considered to be associated with a particular disease, disorder, or condition, if its presence, level and/or form correlates with incidence of and/or susceptibility to the disease, disorder, or condition (e.g., across a relevant population). In some embodiments, two or more entities are physically "associated" with one another if they interact, directly or indirectly, so that they are and/or remain in physical proximity with one another. In some embodiments, two or more entities that are physically associated with one another are covalently linked to one another; in some embodiments, two or more entities that are physically associated with one another are not covalently linked to one another but are non-covalently associated, for example by means of hydrogen bonds, van der Waals interaction, hydrophobic interactions, magnetism, and combinations thereof.

Binding portion: As used herein, refers to a moiety or entity that specifically binds to a target of interest, e.g., a nucleic acid. Typically, the interaction between a binding portion and its target is non-covalent. In many embodiments, a binding portion is one that binds specifically with its target in that it discriminates its target from other potential binding partners in a particular interaction context. In general, a binding portion may be or comprise an entity of any chemical class (e.g., polymer, non-polymer, small molecule, polypeptide, carbohydrate, lipid, nucleic acid, etc). In some embodiments, a binding portion is a single chemical entity. In some embodiments, a binding portion is a complex of two or more discrete chemical entities associated with one another under relevant conditions by non-covalent interactions. Those skilled in the art will appreciate that in some embodiments, a binding portion may comprise a "generic" binding moiety or a "specific" binding moiety.

Comparable: As used herein, the term "comparable" refers to two or more agents, entities, situations, sets of conditions, subjects, etc., that may not be identical to one another but that are sufficiently similar to permit comparison therebetween so that one skilled in the art will appreciate that conclusions may reasonably be drawn based on differences or similarities observed. In some embodiments, comparable sets of conditions, circumstances, individuals, or populations are characterized by a plurality of substantially identical features and one or a small number of varied features. Those of ordinary skill in the art will understand, in context, what degree of identity is required in any given circumstance for two or more such agents, entities, situations, sets of conditions, etc. to be considered comparable. For example, those of ordinary skill in the art will appreciate that sets of circumstances, individuals, or populations are comparable to one another when characterized by a sufficient number and type of substantially identical features to warrant a reasonable conclusion that differences in results obtained or phenomena observed under or with different sets of circumstances, individuals, or populations are caused by or indicative of the variation in those features that are varied.

Control: As used herein, refers to the art-understood meaning of a "control" being a standard against which results are compared. Typically, controls are used to augment integrity in experiments by isolating variables in order to make a conclusion about such variables. In some embodiments, a control is a reaction or assay that is performed simultaneously with a test reaction or assay to provide a comparator. In one experiment, a "test" (i.e., a variable being tested) is applied. In a second experiment, the "control," the variable being tested is not applied. In some embodiments, a control is a historical control (i.e., of a test or assay performed previously, or an amount or result that is previously known). In some embodiments, a control is or comprises a printed or otherwise saved record. A control may be a positive control or a negative control.

Corresponding to: As used herein in the context of nucleic acids, polypeptides, and chemical compounds, the term "corresponding to," designates the position/identity of a structural element, e.g., of an amino acid residue, a nucleic acid residue, or a chemical moiety, in a compound or composition through comparison with an appropriate reference compound or composition. For example, in some embodiments, a monomeric residue in a polymer (e.g., an amino acid residue in a polypeptide or a nucleic acid residue in an oligonucleotide) may be identified as "corresponding to" a residue in an appropriate reference polymer. For example, those of ordinary skill will appreciate that, for purposes of simplicity, residues in a polymer may be designated using a canonical numbering system based on a reference related polymer, so that a residue "corresponding to" one at position 190 of a reference polymer, for example, need not actually be the $190^{th}$ residue in a polymer of interest, but rather refers to the residue that corresponds to the residue found at position 190 in the reference polymer; those of ordinary skill in the art readily appreciate how to identify "corresponding" residues in polymers (e.g., using commercially available sequence comparison software for polypeptide and nucleic acid polymers; optionally manually for other polymers).

Determining, measuring, evaluating, assessing, assaying and analyzing: Determining, measuring, evaluating, assessing, assaying and analyzing are used interchangeably herein to refer to any form of measurement, and include determining if an element is present or not. These terms include both quantitative and/or qualitative determinations. Assaying may be relative or absolute. "Assaying for the presence of" can be determining the amount of something present and/or determining whether or not it is present or absent.

Engineered: In general, the term "engineered" refers to the aspect of having been manipulated by the hand of man. For example, a molecule, a complex, a cell or organism is considered to be "engineered" if it has been manipulated so that its genetic information is altered (e.g., new genetic material not previously present has been introduced, for example by transformation, mating, somatic hybridization, transfection, transduction, or other mechanism, or previously present genetic material is altered or removed, for example by substitution or deletion mutation, or by mating protocols). As is common practice and is understood by those in the art, progeny of an engineered oligonucleotide or cell are typically still referred to as "engineered" even though the actual manipulation was performed on a prior entity.

Functional: As used herein, a "functional" biological molecule is a biological molecule in a form in which it exhibits a property and/or activity by which it is characterized. A biological molecule may have two functions (i.e., bifunctional) or many functions (i.e., multifunctional).

Gene: As used herein, refers to a DNA sequence in a chromosome that codes for a product (e.g., an RNA product and/or a polypeptide product). In some embodiments, a gene includes coding sequence (i.e., sequence that encodes a particular product). In some embodiments, a gene includes non-coding sequence. In some particular embodiments, a gene may include both coding (e.g., exonic) and non-coding (e.g., intronic) sequence. In some embodiments, a gene may include one or more regulatory sequences (e.g., promoters, enhancers, etc.) and/or intron sequences that, for example, may control or impact one or more aspects of gene expression (e.g., cell-type-specific expression, inducible expression, etc.). As used in the present disclosure, the term "gene" generally refers to a portion of a nucleic acid that encodes a polypeptide or fragment thereof; the term may optionally encompass regulatory sequences, as will be clear from context to those of ordinary skill in the art. This definition is not intended to exclude application of the term "gene" to non-protein-coding expression units but rather to clarify that, in most cases, the term as used in this document refers to a polypeptide-coding nucleic acid.

Improve, increase, enhance, inhibit or reduce: As used herein, the terms "improve," "increase," "enhance," "inhibit," "reduce," or grammatical equivalents thereof, indicate values that are relative to a baseline or other reference measurement. In some embodiments, a value is statistically significantly difference that a baseline or other reference measurement. In some embodiments, an appropriate reference measurement may be or comprise a measurement in a particular system (e.g., in a single individual) under otherwise comparable conditions absent presence of (e.g., prior to and/or after) a particular agent or treatment, or in presence of an appropriate comparable reference agent. In some embodiments, an appropriate reference measurement may be or comprise a measurement in comparable system known or expected to respond in a particular way, in presence of the relevant agent or treatment. In some embodiments, an appropriate reference is a negative reference; in some embodiments, an appropriate reference is a positive reference.

Isolated: As used herein, refers to a substance and/or entity that has been (1) separated from at least some of the components with which it was associated when initially produced (whether in nature and/or in an experimental setting), and/or (2) designed, produced, prepared, and/or manufactured by the hand of man. In some embodiments, an isolated substance or entity may be enriched; in some embodiments, an isolated substance or entity may be pure. In some embodiments, isolated substances and/or entities may be separated from about 50%, about 60%, about 70%, about 80%, about 90%, about 91%, about 92%, about 93%, about 94%, about 95%, about 96%, about 97%, about 98%, about 99%, or more than about 99% of the other components with which they were initially associated. In some embodiments, isolated agents are about 80%, about 85%, about 90%, about 91%, about 92%, about 93%, about 94%, about 95%, about 96%, about 97%, about 98%, about 99%, or more than about 99% pure. As used herein, a substance is "pure" if it is substantially free of other components. In some embodiments, as will be understood by those skilled in the art, a substance may still be considered "enriched," "isolated" or even "pure," after having been combined with certain other components such as, for example, one or more carriers or excipients (e.g., buffer, solvent, water, etc.); in such embodiments, percent isolation or purity of the substance is calculated without including such carriers or excipients. Those skilled in the art are aware of a variety of technologies for isolating (e.g., enriching or purifying) substances or agents (e.g., using one or more of fractionation, extraction, precipitation, or other separation).

Nucleic acid: As used herein, in its broadest sense, refers to any compound and/or substance that is or can be incorporated into an oligonucleotide chain. In some embodiments, a nucleic acid is a compound and/or substance that is or can be incorporated into an oligonucleotide chain via a phosphodiester linkage. As will be clear from context, in some embodiments, "nucleic acid" refers to an individual nucleic acid residue (e.g., a nucleotide and/or nucleoside); in some embodiments, "nucleic acid" refers to an oligonucleotide chain comprising individual nucleic acid residues. In some embodiments, a "nucleic acid" is or comprises RNA; in some embodiments, a "nucleic acid" is or comprises DNA. In some embodiments, a nucleic acid is, comprises, or consists of one or more natural nucleic acid residues. In some embodiments, a nucleic acid is, comprises, or consists of one or more nucleic acid analogs. In some embodiments, a nucleic acid analog differs from a nucleic acid in that it does not utilize a phosphodiester backbone. For example, in some embodiments, a nucleic acid is, comprises, or consists of one or more "peptide nucleic acids," which are known in the art and have peptide bonds instead of phosphodiester bonds in the backbone, are considered within the scope of the present invention. Alternatively or additionally, in some embodiments, a nucleic acid has one or more phosphorothioate and/or 5'-N-phosphoramidite linkages rather than phosphodiester bonds. In some embodiments, a nucleic acid is, comprises, or consists of one or more natural nucleosides (e.g., adenosine, thymidine, guanosine, cytidine, uridine, deoxyadenosine, deoxythymidine, deoxy guanosine, and deoxycytidine). In some embodiments, a nucleic acid is, comprises, or consists of one or more nucleoside analogs (e.g., 2-aminoadenosine, 2-thiothymidine, inosine, pyrrolo-pyrimidine, 3-methyl adenosine, 5-methylcytidine, C-5 propynyl-cytidine, C-5 propynyl-uridine, 2-aminoadenosine, C5-bromouridine, C5-fluorouridine, C5-iodouridine, C5-propynyl-uridine, C5-propynyl-cytidine, C5-methylcytidine, 2-aminoadenosine, 7-deazaadenosine, 7-deazaguanosine, 8-oxoadenosine, 8-oxoguanosine, 0(6)-methylguanine, 2-thiocytidine, methylated bases, intercalated bases, and combinations thereof). In some embodiments, a nucleic acid comprises one or more modified sugars (e.g., 2'-fluororibose, ribose, 2'-deoxyribose, arabinose, and hexose) as compared with those in natural nucleic acids. In some embodiments, a nucleic acid has a nucleotide sequence that encodes a functional gene product such as an RNA or protein. In some embodiments, a nucleic acid includes one or more introns. In some embodiments, nucleic acids are prepared by one or more of isolation from a natural source, enzymatic synthesis by polymerization based on a complementary template (in vivo or in vitro), reproduction in a recombinant cell or system, and chemical synthesis. In some embodiments, a nucleic acid is at least 3, 4, 5, 6, 7, 8, 9, 10, 15, 20, 25, 30, 35, 40, 45, 50, 55, 60, 65, 70, 75, 80, 85, 90, 95, 100, 110, 120, 130, 140, 150, 160, 170, 180, 190, 20, 225, 250, 275, 300, 325, 350, 375, 400, 425, 450, 475, 500, 600, 700, 800, 900, 1000, 1500, 2000, 2500, 3000, 3500, 4000, 4500, 5000 or more residues long. In some embodiments, a nucleic acid is partly or wholly single stranded; in some embodiments, a nucleic acid is partly or wholly double stranded. In some embodiments a nucleic acid has a nucleotide sequence comprising at least one element that encodes, or is the complement of a sequence that encodes, a polypeptide. In some embodiments, a nucleic acid has enzymatic activity.

Operably linked: as used herein, refers to a juxtaposition wherein the components described are in a relationship permitting them to function in their intended manner. A control element "operably linked" to a functional element is associated in such a way that expression and/or activity of the functional element is achieved under conditions compatible with the control element. In some embodiments, "operably linked" control elements are contiguous (e.g., covalently linked) with the coding elements of interest; in some embodiments, control elements act in trans to or otherwise at a from the functional element of interest.

Polypeptide: The term "polypeptide," as used herein, generally has its art-recognized meaning of a polymer of at least three amino acids. Those of ordinary skill in the art will appreciate that the term "polypeptide" is intended to be sufficiently general as to encompass not only polypeptides having a complete sequence recited herein, but also to encompass polypeptides that represent functional fragments (i.e., fragments retaining at least one activity) of such complete polypeptides. Moreover, those of ordinary skill in the art understand that protein sequences generally tolerate some substitution without destroying activity. The term "peptide" is generally used to refer to a polypeptide having a length of less than about 100 amino acids, less than about 50 amino acids, less than 20 amino acids, or less than 10 amino acids. In some embodiments, proteins are antibodies, antibody fragments, biologically active portions thereof, and/or characteristic portions thereof.

Reference: As used herein describes a standard or control relative to which a comparison is performed. For example, in some embodiments, an agent, animal, individual, population, sample, sequence or value of interest is compared with a reference or control agent, animal, individual, population, sample, sequence or value. In some embodiments, a reference or control is tested and/or determined substantially simultaneously with the testing or determination of interest. In some embodiments, a reference or control is a historical reference or control, optionally embodied in a tangible medium. Typically, as would be understood by those skilled in the art, a reference or control is determined or characterized under comparable conditions or circumstances to those under assessment. Those skilled in the art will appreciate when sufficient similarities are present to justify reliance on and/or comparison to a particular possible reference or control. In some embodiments, a reference is a negative control reference; in some embodiments, a reference is a positive control reference.

Recovering: as used herein, refers to the process of rendering an agent or entity substantially free of other previously-associated components, for example by isolation, e.g., using purification techniques known in the art. In some embodiments, an agent or entity is recovered from sample, e.g., a natural source and/or a source comprising cells.

Reference: As used herein describes a standard or control relative to which a comparison is performed. For example, in some embodiments, an agent, animal, individual, population, sample, sequence, subject, or value of interest is compared with a reference or control agent, animal, individual, population, sample, sequence, subject, or value. In some embodiments, a reference or control is tested and/or determined substantially simultaneously with the testing or determination of interest. In some embodiments, a reference or control is a historical reference or control, optionally embodied in a tangible medium. Typically, as would be understood by those skilled in the art, a reference or control is determined or characterized under comparable conditions or circumstances to those under assessment. Those skilled in the art will appreciate when sufficient similarities are present to justify reliance on and/or comparison to a particular possible reference or control.

Risk: As will be understood from context, "risk" of a disease, disorder, and/or condition refers to a likelihood that a particular individual will develop the disease, disorder, and/or condition. In some embodiments, risk is expressed as a percentage. In some embodiments, risk is from 0, 1, 2, 3, 4, 5, 6, 7, 8, 9, 10, 20, 30, 40, 50, 60, 70, 80, 90, or up to 100%. In some embodiments risk is expressed as a risk relative to a risk associated with a reference sample or group of reference samples. In some embodiments, a reference sample or group of reference samples have a known risk of a disease, disorder, condition and/or event. In some embodiments a reference sample or group of reference samples are from individuals comparable to a particular individual. In some embodiments, relative risk is 0, 1, 2, 3, 4, 5, 6, 7, 8, 9, 10, or more.

Sample: As used herein, the term "sample" typically refers to an aliquot of material obtained or derived from a source of interest. In some embodiments, a source of interest is a biological or environmental source. In some embodiments, a source of interest may be or comprise a cell or an organism, such as a microbe, a plant, or an animal (e.g., a human). In some embodiments, a source of interest is or comprises biological tissue or fluid. In some embodiments, a biological tissue or fluid may be or comprise amniotic fluid, aqueous humor, ascites, bile, bone marrow, blood, breast milk, cerebrospinal fluid, cerumen, chyle, chime, ejaculate, endolymph, exudate, feces, gastric acid, gastric juice, lymph, mucus, pericardial fluid, perilymph, peritoneal fluid, pleural fluid, pus, rheum, saliva, sebum, semen, serum, smegma, sputum, synovial fluid, sweat, tears, urine, vaginal secretions, vitreous humour, vomit, and/or combinations or component(s) thereof. In some embodiments, a biological fluid may be or comprise an intracellular fluid, an extracellular fluid, an intravascular fluid (blood plasma), an interstitial fluid, a lymphatic fluid, and/or a transcellular fluid. In some embodiments, a biological fluid may be or comprise a plant exudate. In some embodiments, a biological tissue or sample may be obtained, for example, by aspirate, biopsy (e.g., fine needle or tissue biopsy), swab (e.g., oral, nasal, skin, or vaginal swab), scraping, surgery, washing or lavage (e.g., bronchoalveolar, ductal, nasal, ocular, oral, uterine, vaginal, or other washing or lavage). In some embodiments, a biological sample is or comprises cells obtained from an individual. In some embodiments, a sample is a "primary sample" obtained directly from a source of interest by any appropriate means. In some embodiments, as will be clear from context, the term "sample" refers to a preparation that is obtained by processing (e.g., by removing one or more components of and/or by adding one or more agents to) a primary sample. For example, filtering using a semi-permeable membrane. Such a "processed sample" may comprise, for example nucleic acids or proteins extracted from a sample or obtained by subjecting a primary sample to one or more techniques such as amplification or reverse transcription of nucleic acid, isolation and/or purification of certain components, etc.

Small molecule: As used herein, the term "small molecule" means a low molecular weight organic and/or inorganic compound. In general, a "small molecule" is a molecule that is less than about 5 kilodaltons (kD) in size. In some embodiments, a small molecule is less than about 4 kD, 3 kD, about 2 kD, or about 1 kD. In some embodiments, the small molecule is less than about 800 daltons (D), about 600 D, about 500 D, about 400 D, about 300 D, about 200 D, or about 100 D. In some embodiments, a small molecule is less than about 2000 g/mol, less than about 1500 g/mol, less than about 1000 g/mol, less than about 800 g/mol, or less than about 500 g/mol. In some embodiments, a small molecule is not a polymer. In some embodiments, a small molecule does not include a polymeric moiety. In some embodiments, a small molecule is not and/or does not comprise a protein or polypeptide (e.g., is not an polypeptide or peptide). In some embodiments, a small molecule is not and/or does not comprise a nucleic acid (e.g., is not an oligonucleotide). In some embodiments, a small molecule is not and/or does not comprise a polysaccharide; for example, in some embodiments, a small molecule is not a glycoprotein, proteoglycan, glycolipid, etc.). In some embodiments, a small molecule is not a lipid. In some embodiments, a small molecule is detectable (e.g., comprises at least one detectable moiety). In some embodiments, a small molecule is a therapeutic agent. Those of ordinary skill in the art, reading the present disclosure, will appreciate that certain small molecule compounds described herein may be provided and/or utilized in any of a variety of forms such as, for example, crystal forms, salt forms, protected forms, prodrug forms, ester forms, isomeric forms (e.g., optical and/or structural isomers), isotopic forms, etc. Those of skill in the art will appreciate that certain small molecule compounds have structures that can exist in one or more steroisomeric forms. Those of skill in the art will appreciate that certain small molecule compounds have structures that can exist in one or more tautomeric forms. Those of skill in the art will also appreciate that certain small molecule compounds have structures that permit isotopic substitution (e.g., $^{2}H$ or $^{3}H$ for H; $^{11}C$, $^{13}C$ or $^{14}C$ for 12C; $^{13}N$ or $^{15}N$ for 14N; $^{17}O$ or $^{18}O$ for 16O; $^{36}Cl$ for XXC; $^{18}F$ for XXF; 131I for XXXI; etc). In some embodiments, a particular small molecule compound may be provided and/or utilized in a salt form (e.g., in an acid-addition or base-addition salt form, depending on the compound); in some such embodiments, the salt form may be a pharmaceutically acceptable salt form.

Specific binding: As used herein, the term "specific binding" refers to an ability to discriminate between possible binding partners in the environment in which binding is to occur. A binding agent that interacts with one particular target when other potential targets are present is said to "bind specifically" to the target with which it interacts. In some embodiments, specific binding is assessed by detecting or determining degree of association between the binding agent and its partner; in some embodiments, specific binding is assessed by detecting or determining degree of dissociation of a binding agent-partner complex; in some embodiments, specific binding is assessed by detecting or determining ability of the binding agent to compete an alternative interaction between its partner and another entity. In some embodiments, specific binding is assessed by performing such detections or determinations across a range of concentrations.

Subject: As used herein, the term "subject" refers to an individual to which a provided treatment is administered. In some embodiments, a subject is animal. In some embodiments, a subject is a mammal, e.g., a mammal that experiences or is susceptible to a disease, disorder, or condition as described herein. In some embodiments, an animal is a vertebrate, e.g., a mammal, such as a non-human primate, (particularly a higher primate), a sheep, a dog, a rodent (e.g. a mouse or rat), a guinea pig, a goat, a pig, a cat, a rabbit, or a cow. In some embodiments, an animal is a non-mammal animal, such as a chicken, an amphibian, or a reptile. In some embodiments, a subject is a human. In some embodiments, a patient is suffering from or susceptible to one or more diseases, disorders or conditions as described herein. In some embodiments, a patient displays one or more symptoms of a one or more diseases, disorders or conditions as described herein. In some embodiments, a patient has been diagnosed with one or more diseases, disorders or conditions as described herein. In some embodiments, the subject is receiving or has received certain therapy to diagnose and/or to treat a disease, disorder, or condition. In another embodiment, the subject is an experimental animal or animal substitute as a disease model.

Substantially: As used herein, refers to the qualitative condition of exhibiting total or near-total extent or degree of a characteristic or property of interest. One of ordinary skill in the biological arts will understand that biological and chemical phenomena rarely, if ever, go to completion and/or proceed to completeness or achieve or avoid an absolute result. The term "substantially" is therefore used herein to capture the potential lack of completeness inherent in many biological and chemical phenomena.

Variant: As used herein, the term "variant" refers to an entity that shows significant structural identity with a reference entity but differs structurally from the reference entity in the presence or level of one or more chemical moieties as compared with the reference entity. In many embodiments, a variant also differs functionally from its reference entity. In general, whether a particular entity is properly considered to be a "variant" of a reference entity is based on its degree of structural identity with the reference entity. As will be appreciated by those skilled in the art, any biological or chemical reference entity has certain characteristic structural elements. A variant is a distinct chemical entity that shares one or more such characteristic structural elements.

BRIEF DESCRIPTION OF THE DRAWING

FIG. 1 includes a schematic of exemplary baits bound to a nucleic acid (e.g., double stranded DNA or RNA).

DETAILED DESCRIPTION OF CERTAIN EMBODIMENTS

Baits

The present disclosure provides nucleic acid baits.

In some embodiments, a bait described herein comprises a nucleic acid-binding portion and a substrate (e.g., a non-silica capture substrate). In some embodiments, a nucleic acid-binding portion is bound to a substrate (e.g., a non-silica capture substrate).

In some embodiments, the present disclosure describes a bait comprises a nucleic acid-binding portion, and a substrate-binding portion, which can bind to a substrate (e.g., a non-silica capture substrate).

Nucleic Acid-Binding Portion of a Bait

In some embodiments, a bait as described herein can comprise a first portion, which can be a nucleic acid-binding portion. In some embodiments, a nucleic acid-binding portion is capable of binding to a nucleic acid, e.g., in a sequence-independent manner. In some embodiments, a nucleic acid-binding portion can be a generic, non-oligo nucleic acid-binding portion that specifically targets RNA, DNA, or both. Such a nucleic acid-binding portion provides a bait with specificity for nucleic acids, as compared to other components of a sample, e.g., a biological sample. A nucleic acid-binding portion as described herein can ensure an affinity and specificity for nucleic acids which is not limited to a specific nucleic acid sequence. A nucleic acid-binding portion as described herein may not have sequence-specificity to a target nucleic acid, e.g., in some embodiments, a nucleic acid-binding portion as described herein does not comprise a nucleic acid (e.g., DNA, RNA, or both).

In some embodiments, a nucleic acid-binding portion as described herein is capable of binding to RNA in a nucleic acid sequence-independent manner. In some embodiments, a nucleic acid-binding portion as described herein is capable of binding to single stranded RNA in a nucleic acid sequence-independent manner. In some embodiments, a nucleic acid-binding portion as described herein is capable of binding to double stranded RNA in a nucleic acid sequence-independent manner.

In some embodiments, a nucleic acid-binding portion as described herein is capable of binding to DNA in a nucleic acid sequence-independent manner. In some embodiments, a nucleic acid-binding portion as described herein is capable of binding to single stranded DNA in a nucleic acid sequence-independent manner. In some embodiments, a nucleic acid-binding portion as described herein is capable of binding to double stranded DNA in a nucleic acid sequence-independent manner.

A nucleic acid-binding portion as described herein may have affinity to, e.g., a nucleic acid structure. In some embodiments, a nucleic acid-binding portion as described herein is capable of binding to the minor groove of double stranded DNA. In some embodiments, a nucleic acid-binding portion as described herein is capable of binding to the major groove of double stranded DNA. In some embodiments, a nucleic acid-binding portion as described herein is capable of inserting between planar bases of a nucleic acid. In some embodiments, a nucleic acid-binding portion as described herein is or comprises an intercalator.

In some embodiments, a nucleic acid-binding portion as described herein is or comprises a small molecule. In some embodiments, a nucleic acid-binding portion as described herein is or comprises a chemical entity. In some embodiments, a nucleic acid-binding portion as described herein is or comprises an nucleic acid binding dye.

In some embodiments, a nucleic acid binding dye as described herein is or comprises a bisbenzimide. In some embodiments, a bisbenzimide is or comprises Hoechst 33258, Hoechst 33342, or Hoechst 34580.

In some embodiments, a nucleic acid binding dye as described herein is or comprises 4',6-diamidino-2-phenylindole (DAPI).

In some embodiments, a nucleic acid binding dye as described herein is or comprises SYTO 9, SYTO 11, SYTO 12, SYTO 13, SYTO 14, SYTO 15, SYTO 16, SYTO 17, SYTO 18, SYTO 20, SYTO 21, SYTO 22, SYTO 23, SYTO 24, SYTO 25, SYTO 59, SYTO 60, SYTO 61, SYTO 62, SYTO 63, SYTO 64, or SYTO BC.

In some embodiments, a nucleic acid binding dye as described herein is or comprises a cyanine dye. In some embodiments, a cyanine dye is or comprises PicoGreen, OliGreen and RiboGreen, SYBR Gold, SYBR Green I, or SYBR Green II. In some embodiments, a cyanine dye is or comprises a cyanine dimer. In some embodiments, a cyanine dye is or comprises POPO-1, BOBO-1, YOYO-1, TOTO-1, JOJO-1, POPO-3, LOLO-1, BOBO-3, YOYO-3, or TOTO-3.

In some embodiments, a nucleic acid binding dye as described herein is or comprises a phenanthridine or an acridine. In some embodiments, a phenanthridine is or comprises ethidium bromide, propidium iodide, hexidium iodide, dihydroethidium, ethidium homodimer-1, or ethidium homodimer-2. In some embodiments, an acridine is acridine orange.

In some embodiments, a nucleic acid binding dye as described herein is or includes a triarylmethane dye. In some embodiments, a triarylmethane dye is crystal violet.

In some embodiments, a nucleic acid binding dye as described herein is or includes a fluorescent dye. In some embodiments, a fluorescent dye is 7-aminoactinomycin D.

Substrate-Binding Portion of a Bait

In some embodiments, a bait can comprise a second portion. A second portion can be a substrate-binding portion, which is capable of binding to a substrate, e.g., a non-silica capture substrate. Combining a nucleic acid-binding portion with affinity for nucleic acid and a substrate (e.g., a non-silica based magnetic bead) can lower nonspecific binding during nucleic acid extraction. A bait can then be used for concentrating, enriching or isolating a bound target nucleic acid.

For instance, a bait as disclosed herein can include a substrate-binding portion that is or comprises a modification, which enables binding of a bait to a substrate, e.g., a magnetic bead. To manipulate and/or concentrate a bound nucleic acid, a bait can be modified to enable binding (e.g., direct or indirect binding) of the bait and bound nucleic acid onto a magnetic bead (e.g., biotin, streptavidin). As magnetic beads that are not silica coated have a lower affinity for nonspecific binding, total nucleic acid can be bound with higher specificity. A bait as described herein can thus combine a 'generic' (e.g., sequence independent) affinity for nucleic acid with a low non-specific binding substrate (e.g., a magnetic bead, (e.g., not silica)).

In some embodiments, a bait comprises a first portion and a second portion. In some embodiments, a first portion is a nucleic acid-binding portion as described herein. In some embodiments, a second portion is a substrate-binding portion. A substrate-binding portion can be capable of binding to a substrate. In some embodiments, a substrate is a non-silica capture substrate. In some embodiments, a non-silica capture substrate as described herein comprises one or more beads. In some embodiments, one or more beads are one or more magnetic beads.

In some embodiments, a substrate-binding portion as described herein is capable of binding to a non-silica capture substrate directly or indirectly.

In some embodiments, a substrate-binding portion as described herein is or comprises a ligand and a substrate is or comprises a ligand-binding protein. In some embodiments, a ligand is or comprises biotin or desthiobiotin and a ligand-binding protein is or comprises avidin, streptavidin, Tamavidin 1, Tamavidin 2, NeutrAvidin, or CaptAvidin.

In some embodiments, a substrate-binding portion as described herein is or comprises an amine and the non-silica capture substrate is or comprises one or more N-hydroxysuccinimide esters, one or more aldehydes, one or more isocyanates, one or more acyl azides, one or more carbodiimides, one or more carbonates, one or more epoxides, one or more fluorophenyl esters, one or more anhydrides, one or more imidoesters, or a combination thereof.

In some embodiments, a substrate-binding portion as described herein comprises a sulphydryl group or an amine and a substrate comprises one or more carboxylic acids.

In some embodiments, a substrate-binding portion as described herein comprises an amine or a sulphydryl group and a substrate comprises one or more tosyl groups.

In some embodiments, a bait described herein comprises a nucleic acid-binding portion and a substrate (e.g., a non-silica capture substrate). In some embodiments, a nucleic acid-binding portion as described herein is (e.g., directly or indirectly) bound to a substrate (e.g., a non-silica capture substrate). In some embodiments, a nucleic acid-binding portion as described herein can comprise a substrate-binding portion, e.g., a modification. In some embodiments, a modification can enable binding to a substrate (e.g., a modified substrate comprising (e.g., streptavidin or biotinylation)). In some embodiments, a modification can enable binding of a nucleic acid-binding portion to a magnetic bead. In some embodiments, a substrate-binding portion as described herein is a substituent on a nucleic acid-binding portion. In some embodiments, a substrate-binding portion as described herein is or comprises an amine or a sulphydryl group.

Certain Additional Bait Features

A bait described herein can comprise a linker. In some embodiments, a nucleic acid-binding portion is joined to a substrate-binding portion via a linker. In some embodiments, a nucleic acid-binding portion is joined to a substrate via a linker. In some embodiments, a linker as described herein is or comprises a spacer. In some embodiments, a linker as described herein is or comprises a polyethylene glycol.

In some embodiments, a bait as described herein includes a modification that enhances its water solubility when compared to a comparable bait without the modification.

In some embodiments, a bait as described herein includes one or more polyethylene glycol moieties.

Bait-Nucleic Acid Complex

Among other things, the present disclosure provides a complex comprising a bait as described herein, and a nucleic acid bound to a nucleic acid-binding portion of the bait. In some embodiments, a bait includes a substrate-binding portion as described herein and a complex comprises a substrate (e.g., a non-silica capture substrate) bound to the a substrate-binding portion of the bait. In some embodiments, a nucleic acid can be bound a nucleic acid-binding portion of a bait as described herein, which binds to, e.g., a nucleic acid structure (e.g., a major or a minor groove, or planar nucleic acid bases).

In some embodiments, a nucleic acid-binding portion can be bound to a substrate (e.g., a magnetic bead) before nucleic acid binding (e.g., direct capture) or after nucleic acid binding (e.g., indirect capture). Binding of a nucleic acid-binding portion to a substrate (e.g., a magnetic bead) can enable capture of a nucleic acid from solution, manipulation of a captured nucleic acid via a substrate (e.g., a magnetic bead). Baits including a nucleic acid-binding portion as described herein can be used with a magnetic bead (e.g., bound directly or indirectly) to concentrate the nucleic acid. Due to the specificity of a nucleic acid-binding portion to a nucleic acid structural motif, total nucleic acid capture can be enabled.

Kits

Among other things, the present disclosure provides a kit comprising a bait as described herein. In some embodiments, a kit as described herein comprises a substrate, e.g., a non-silica capture substrate.

Methods of Using Baits

Among other things, the present disclosure provides a method. In some embodiments, a method as described herein is a method of isolating a nucleic acid(s). In some embodiments, a method as described herein is a method of amplifying a nucleic acid(s). In some embodiments, a method as described herein is a method of sequencing a nucleic acid(s). In some embodiments, a method as described herein is a method of detecting a mutation in a nucleic acid(s). In some embodiments, a method as described herein is a method of genotyping a subject. In some embodiments, a method as described herein is a method of diagnosing a subject, e.g., with a disease or condition mediated by a nucleic acid mutation.

In some embodiments, a method comprises contacting a sample comprising a plurality of nucleic acids with one or more baits as described herein. In some embodiments, one or more baits are a plurality of baits. In some embodiments, a method as described herein comprises contacting a sample comprising a plurality of nucleic acids with one or more baits as described herein and a non-silica capture substrate, thereby forming a sample comprising one or more nucleic acid-bait-substrate complexes.

In some embodiments, a method comprises removing one or more nucleic acid-bait-substrate complexes from a sample. In some embodiments, a method comprises releasing a plurality of nucleic acids from one or more nucleic acid-bait-substrate complexes.

In some embodiments, a method comprises releasing a plurality of nucleic acids from one or more nucleic acid-bait-substrate complexes, thereby isolating one or more nucleic acids. In some embodiments, a method comprises amplifying one or more isolated nucleic acids, e.g., by polymerase chain reaction (PCR). In some embodiments, a method comprises sequencing one or more isolated nucleic acids, e.g., by Sanger sequencing or next-generation sequencing. In some embodiments, a method comprises sequencing one or more isolated nucleic acids and detecting a mutation in the one or more isolated nucleic acids.

In some embodiments, a sample is obtained from a subject and a method comprises sequencing one or more isolated nucleic acids and detecting a mutation in the one or more isolated nucleic acids, thereby diagnosing a subject, e.g., with a disease or condition mediated by a nucleic acid mutation. In some embodiments, a sample is obtained from a subject and a method comprises sequencing one or more isolated nucleic acids, thereby genotyping a subject.

In some embodiments, a plurality of baits as described herein consists of a plurality of identical baits. In some embodiments, a plurality of baits as described herein comprises two or more subsets of baits, where the subsets of baits are different from each other. In some embodiments, different baits comprise different first portions and/or different second portions.

In some embodiments, a sample as described herein was obtained from a mammal. In some embodiments, a mammal is a human. In some embodiments, a sample as described herein was obtained from a plant. In some embodiments, a sample as described herein was obtained from a bacteria, virus, or yeast cell.

In some embodiments, a sample as described herein is or comprises tissue or cells. In some embodiments, a sample as described herein is or comprises whole blood, plasma, sputum, saliva, stool, serum, or urine. In some embodiments, a sample as described herein is or comprises tumor cells. In some embodiments, a tumor cells are circulating tumor cells. In some embodiments, a sample as described herein is or comprises fetal cells. In some embodiments, fetal cells are circulating fetal cells.

In some embodiments, a sample as described herein comprises a swab, or a swab in transport media.

In some embodiments, a method as described herein comprises separating one or more nucleic acid-bait-substrate complexes from a sample.

Due to the affinity of baits described herein for nucleic acid, certain baits can be used in "standard conditions," e.g., simple phosphate buffer. Baits described herein can be used, for example, to bind nucleic acid in whole cells. Using baits described herein, there is potential that cellular lysis and nucleic acid binding could occur in relatively inert conditions, e.g., not requiring high salts, detergents, heat, or a combination thereof. Rather binding could directly occur in the sample following mechanical lysis or sonication.

A method could potentially eliminate the need for harsh salts, detergents, or both in a lysis buffer, while improving performance through reduced inhibitors in nucleic acid extraction. By tailoring baits described herein for specific targets (e.g., RNA versus DNA), differential extractions of RNA and DNA may be able to occur.

EXAMPLES

The following examples are provided so as to describe to the skilled artisan how to make and use methods and compositions described herein, and are not intended to limit the scope of the present disclosure.

Example 1

A sample comprising a plurality of nucleic acids is heated to 65° C. A buffered mixture comprising one or more baits as described herein is heated to 65° C. One or more baits as described herein is added to the sample, which is then heated to 95° C. for five minutes. The baits-sample mixture is then cooled to 65° C. so that one or more nucleic acid-bait complexes are formed. The baits-sample mixture is exposed to a substrate, e.g., non-silica beads so that one or more nucleic acid-bait-substrate complexes. The beads (with captured nucleic acid) are then removed from the mixture by centrifuging the mixture and removing the supernatant. As known in the art, magnetic beads can also be used and the beads (with captured nucleic acid) can be removed from the mixture with a magnet.

OTHER EMBODIMENTS

It is to be appreciated by those skilled in the art that various alterations, modifications, and improvements to the present disclosure will readily occur to those skilled in the art. Such alterations, modifications, and improvements are intended to be part of the present disclosure, and are intended to be within the spirit and scope of the invention. Accordingly, the foregoing description and drawing are by way of example only and any invention described in the present disclosure if further described in detail by the claims that follow.

Those skilled in the art will appreciate typical standards of deviation or error attributable to values obtained in assays or other processes as described herein. The publications, websites and other reference materials referenced herein to describe the background of the invention and to provide additional detail regarding its practice are hereby incorporated by reference in their entireties.

It is to be understood that while embodiments of the invention have been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A nucleic acid capture bait, comprising:
(a) a first portion capable of binding to an oligonucleotide in a nucleic acid sequence-independent manner, wherein the first portion comprises a nucleic acid binding dye selected from the group consisting of 4',6-diamidino-2-phenylindole (DAPI), a SYTO, a phenanthridine, and a fluorescent dye, and wherein at least one of:
  (i) the SYTO is selected from the group consisting of SYTO 9, SYTO 11, SYTO 12, SYTO 13, SYTO 14, SYTO 15, SYTO 16, SYTO 17, SYTO 18, SYTO 20, SYTO 21, SYTO 22, SYTO 23, SYTO 24, SYTO 25, SYTO 59, SYTO 60, SYTO 61, SYTO 62, SYTO 63, SYTO 64, or SYTO BC;
  (ii) the phenanthridine is selected from the group consisting of ethidium bromide, propidium iodide, hexidium iodide, dihydroethidium, ethidium homodimer-1, or ethidium homodimer-2; and/or
  (iii) the fluorescent dye is 7-aminoactinomycin D; and
(b) a second portion capable of binding to a non-silica capture substrate.

2. The nucleic acid capture bait of claim 1, wherein the second portion is a modification on the first portion.

3. The nucleic acid capture bait of claim 1, wherein the second portion is a substituent of the first portion.

4. The nucleic acid capture bait of claim 1, wherein the second portion comprises an amine or a sulphydryl group.

5. The nucleic acid capture bait of claim 1, wherein the second portion comprises a ligand, and the non-silica capture substrate comprises a ligand-binding protein.

6. The nucleic acid capture bait of claim 5, wherein the ligand is biotin or desthiobiotin, and the ligand-binding protein is selected from avidin, streptavidin, Tamavidin 1, Tamavidin 2, NeutrAvidin, or CaptAvidin.

7. The nucleic acid capture bait of claim 1, wherein the second portion comprises an amine, and the non-silica capture substrate comprises one or more N-hydroxysuccinimide esters, one or more aldehydes, one or more isocyanates, one or more acyl azides, one or more carbodiimides, one or more carbonates, one or more epoxides, one or more fluorophenyl esters, one or more anhydrides, one or more imidoesters, or a combination thereof.

8. The nucleic acid capture bait of claim 1, further comprising a linker, wherein the first portion is joined to the second portion via the linker.

9. The nucleic acid capture bait of claim 8, wherein the linker is a spacer.

10. The nucleic acid capture bait of claim 8, wherein the linker is a polyethylene glycol.

11. A nucleic acid capture bait, comprising:
(a) a first portion capable of binding to an oligonucleotide in a nucleic acid sequence-independent manner, wherein the first portion comprises a nucleic acid binding dye selected from the group consisting of 4',6-diamidino-2-phenylindole (DAPI), a SYTO, a phenanthridine, and a fluorescent dye, and wherein at least one of:
  (i) the SYTO is selected from the group consisting of SYTO 9, SYTO 11, SYTO 12, SYTO 13, SYTO 14, SYTO 15, SYTO 16, SYTO 17, SYTO 18, SYTO 20, SYTO 21, SYTO 22, SYTO 23, SYTO 24, SYTO 25, SYTO 59, SYTO 60, SYTO 61, SYTO 62, SYTO 63, SYTO 64, or SYTO BC;
  (ii) the phenanthridine is selected from the group consisting of ethidium bromide, propidium iodide, hexidium iodide, dihydroethidium, ethidium homodimer-1, or ethidium homodimer-2; and/or
  (iii) the fluorescent dye is 7-aminoactinomycin D; and
(b) a second portion capable of binding to a non-silica capture substrate; and
(c) a linker that joins the second portion to the first portion.

12. The nucleic acid capture bait of claim 11, wherein the linker is a spacer.

13. The nucleic acid capture bait of claim 11, wherein the linker is a polyethylene glycol.

14. The nucleic acid capture bait of claim 11, wherein the second portion comprises an amine or a sulphydryl group.

15. The nucleic acid capture bait of claim 11, wherein the second portion comprises a ligand, and the non-silica capture substrate comprises a ligand-binding protein.

16. The nucleic acid capture bait of claim 15, wherein the ligand is biotin or desthiobiotin, and the ligand-binding protein is selected from avidin, streptavidin, Tamavidin 1, Tamavidin 2, NeutrAvidin, or CaptAvidin.

17. The nucleic acid capture bait of claim 11, wherein the second portion comprises an amine, and the non-silica capture substrate comprises one or more N-hydroxysuccinimide esters, one or more aldehydes, one or more isocyanates, one or more acyl azides, one or more carbodiimides, one or more carbonates, one or more epoxides, one or more fluorophenyl esters, one or more anhydrides, one or more imidoesters, or a combination thereof.

18. A nucleic acid capture bait complex, comprising:
(a) a first portion capable of binding to an oligonucleotide in a nucleic acid sequence-independent manner, wherein the first portion comprises a nucleic acid binding dye selected from the group consisting of 4',6-diamidino-2-phenylindole (DAPI), a SYTO, a phenanthridine, and a fluorescent dye, and wherein at least one of:
  (i) the SYTO is selected from the group consisting of SYTO 9, SYTO 11, SYTO 12, SYTO 13, SYTO 14, SYTO 15, SYTO 16, SYTO 17, SYTO 18, SYTO 20, SYTO 21, SYTO 22, SYTO 23, SYTO 24, SYTO 25, SYTO 59, SYTO 60, SYTO 61, SYTO 62, SYTO 63, SYTO 64, or SYTO BC;
  (ii) the phenanthridine is selected from the group consisting of ethidium bromide, propidium iodide, hexidium iodide, dihydroethidium, ethidium homodimer-1, or ethidium homodimer-2; and/or
  (iii) the fluorescent dye is 7-aminoactinomycin D; and
(b) a second portion; and
(c) a non-silica capture substrate; and
wherein the first portion is bound to the non-silica capture substrate via the second portion.

19. The nucleic acid capture bait complex of claim 18, wherein the non-silica capture substrate comprises one or more beads.

20. The nucleic acid capture bait complex of claim 19, wherein the one or more beads are one or more magnetic beads.

21. The nucleic acid capture bait complex of claim 18, wherein the second portion is a modification on the first portion.

22. The nucleic acid capture bait complex of claim 18, wherein the second portion is a substituent of the first portion.

23. The nucleic acid capture bait complex of claim 18, wherein the second portion comprises an amine or a sulphydryl group.

24. The nucleic acid capture bait of claim 18, wherein the second portion comprises a ligand, and the non-silica capture substrate comprises a ligand-binding protein.

25. The nucleic acid capture bait complex of claim 24, wherein the ligand is biotin or desthiobiotin, and the ligand-binding protein is selected from avidin, streptavidin, Tamavidin 1, Tamavidin 2, NeutrAvidin, or CaptAvidin.

26. The nucleic acid capture bait complex of claim 18, wherein the second portion comprises an amine, and the non-silica capture substrate comprises one or more N-hydroxysuccinimide esters, one or more aldehydes, one or more isocyanates, one or more acyl azides, one or more carbodiimides, one or more carbonates, one or more epoxides, one or more fluorophenyl esters, one or more anhydrides, one or more imidoesters, or a combination thereof.

27. The nucleic acid capture bait complex of claim 18, wherein the second portion comprises a sulphydryl group or an amine, and the non-silica capture substrate comprises one or more carboxylic acids.

28. The nucleic acid capture bait complex of claim 18, wherein the second portion comprises an amine or a sulphydryl group, and the non-silica capture substrate comprises one or more tosyl groups.

29. The nucleic acid capture bait complex of claim 18, further comprising a linker, wherein the first portion is joined to the second portion via the linker.

30. The nucleic acid capture bait complex of claim 29, wherein the linker is a spacer.

31. The nucleic acid capture bait complex of claim 29, wherein the linker is a polyethylene glycol.

\* \* \* \* \*